United States Patent [19]

Tamura et al.

[11] Patent Number: 4,674,792
[45] Date of Patent: Jun. 23, 1987

[54] POSITION ADJUSTABLE SEE-THROUGH HEADREST

[75] Inventors: Hisao Tamura; Takuji Kawakami, both of Kanagawa, Japan

[73] Assignees: Ikeda Bussan Co, Ltd., Ayase; Ikeda Kinzokukuogyo Co, Ltd., Yamato, both of Japan

[21] Appl. No.: 870,885

[22] Filed: Jun. 5, 1986

[30] Foreign Application Priority Data

Jun. 7, 1985 [JP] Japan ............................ 60-123740
Jun. 13, 1985 [JP] Japan ............................ 60-89110

[51] Int. Cl.⁴ .............................................. A47C 1/10
[52] U.S. Cl. .................................. 297/408; 297/409; 297/410
[58] Field of Search .................... 297/408, 409, 410

[56] References Cited

U.S. PATENT DOCUMENTS 3,858,937  1/1975  Norris ............................. 297/408

FOREIGN PATENT DOCUMENTS 0002730  7/1979  European Pat. Off. .
0113645  7/1984  European Pat. Off. ............ 297/408
3513227  10/1975  Fed. Rep. of Germany ...... 297/408
2911321  9/1979  Fed. Rep. of Germany ...... 297/408
1245901  9/1971  United Kingdom .
1245544  9/1971  United Kingdom .

Primary Examiner—James T. McCall
Attorney, Agent, or Firm—Schwartz, Jeffery, Schwaab, Mack, Blumenthal & Evans

[57] ABSTRACT

A position adjustable see-through headrest comprises a lower frame shaft which extends across parallel headrest stays extending from a seatback, a pivotal reversed U-shaped structure pivotally connected to the lower frame shaft so as to be pivotal about the axis of the lower frame shaft, a position adjusting mechanism arranged between the pivotal reversed U-shaped structure and the lower frame shaft in a manner to lock the pivotal reversed U-shaped structure to a selected one of the angular positions relative to the fixed lower frame shaft, a cover member covering the mechanism so as to conceal the same from the exterior of the cover member without affecting the function of the mechanism, and a pad member covering substantially entire of a unit which includes the lower frame shaft, the pivotal reversed U-shaped structure and the position adjusting mechanism.

10 Claims, 10 Drawing Figures

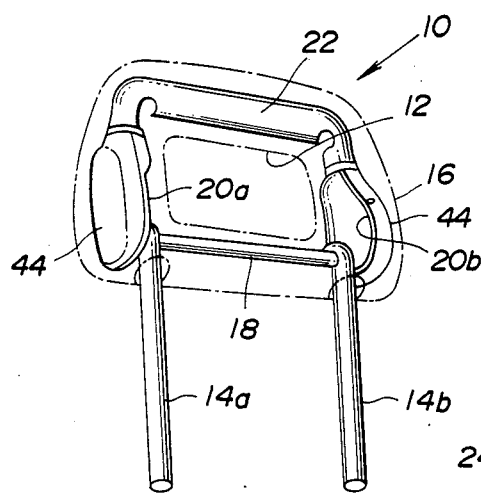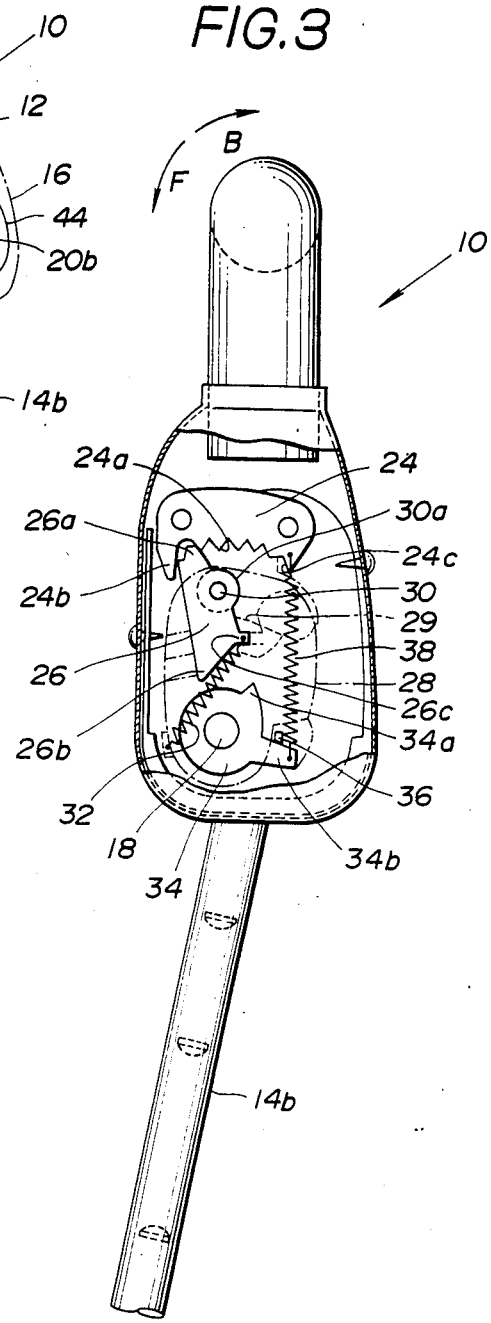

4,674,792

POSITION ADJUSTABLE SEE-THROUGH HEADREST

BACKGROUND OF THE INVENTION

1. Field of the Invention

The present invention relates in general to a headrest which is mounted on a seatback of a seat to support the head of a seat occupant, and more particularly to an angular position adjustable headrest which is pivotally movable to a desired angular position relative to the seatback to effectively and comfortably support the head of the seat occupant. More specifically, the present invention is concerned with an angular position adjustable headrest of a see-through type which has an aperture formed therethrough.

2. Description of the Prior Art

Hitherto, various kinds of headrests have been proposed and put into practical use in the field of automotive seats in order to give safety and comfortable sitting posture to the seat occupants. In order to improve the comfort, some of them are of a position adjustable type which is adjustable in angular position relative to the seatback on which the headrest is mounted.

In the field of the automotive seats nowadays proposed, there are also headrests called "see-through headrest" which is formed at its central portion with an aperture by which forward visibility given to a rear seat passenger is increased. Thus, recently, a position adjustable see-through headrest has made a debut which possesses the respective advantages of them at the same time.

Japanese Utility Model First Provisional Publication No. 59-174055 discloses one of the position adjustable see-through headrests. However, due to a limited parts mounting space owing to presence of the aperture in the headrest proper, it has been difficult to install the position adjusting mechanism in the apertured headrest. Thus, the hiterto proposed headrests of such type have been obliged to either increase the size of the headrest so as to be unsightly or reduce the size of the aperture of the headrest to an unpractical level. Furthermore, the conventional headrests have been insufficient in reducing the production cost because of the complicated construction thereof.

SUMMARY OF THE INVENTION

It is therefore an essential object of the present invention to provide an improved position adjustable see-through headrest which is free of the above-mentioned drawbacks.

According to the present invention, there is provided an angular position adjustable see-through headrest adapted to be mounted on a seatback of a seat, which comprises stays extending from the seatback, a lower frame shaft extending across the stays and secured to the same, a pivotal reversed U-shaped structure pivotally connected to the lower frame shaft so as to be pivotal about the axis of the lower frame shaft between first and second extreme angular positions, a position adjusting mechanism arranged between the pivotal reversed U-shaped structure and the lower frame shaft for locking the pivotal reversed U-shaped structure to a selected one of the angular positions relative to the fixed lower frame shaft, a cover member covering the mechanism so as to conceal the same from the exterior of the cover member without affecting the function of the mechanism, and a pad member covering substantially the entire unit which includes the lower frame shaft, the pivotal reversed U-shaped structure and the mechanism.

BRIEF DESCRIPTION OF THE DRAWINGS

Other objects and advantages of the present invention will become apparent from the following description when taken in conjunction with the accompanying drawings, in which:

FIG. 1 is a perspective view of a first embodiment of a position adjustable see-through headrest of the present invention, showing the interior structure by solid lines;

FIG. 3 is a side view of the interior structure of the headrest of the first embodiment;

DETAILED DESCRIPTION OF THE INVENTION

Figure 2:
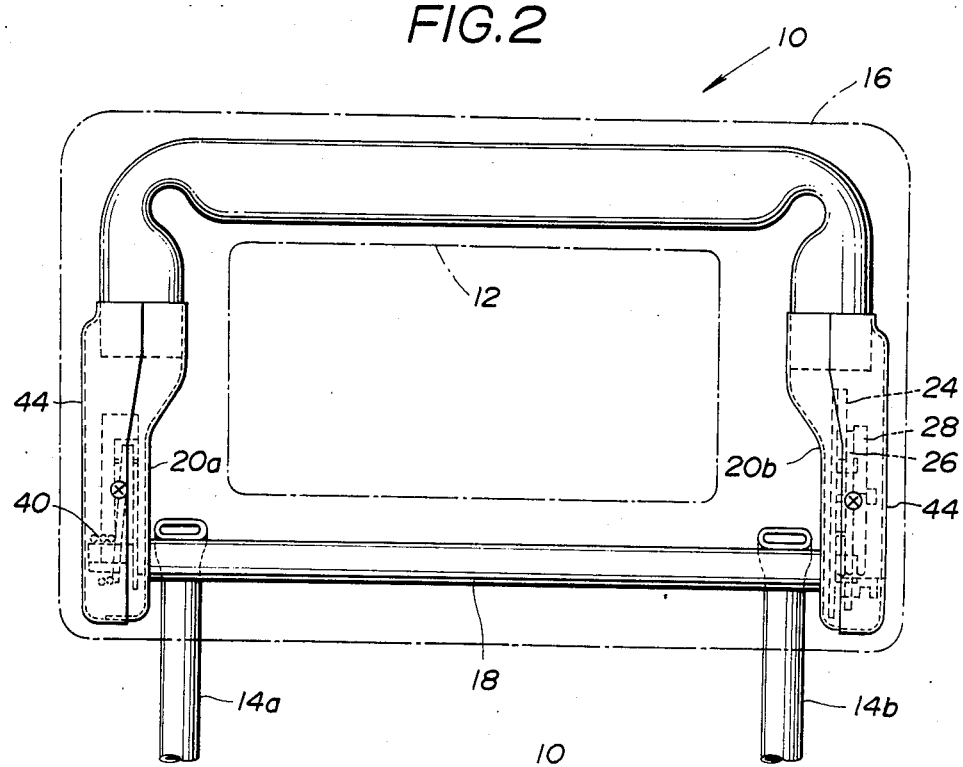
FIG. 2 is a front view of the interior structure of the headrest of the first embodiment.
Figure 4:
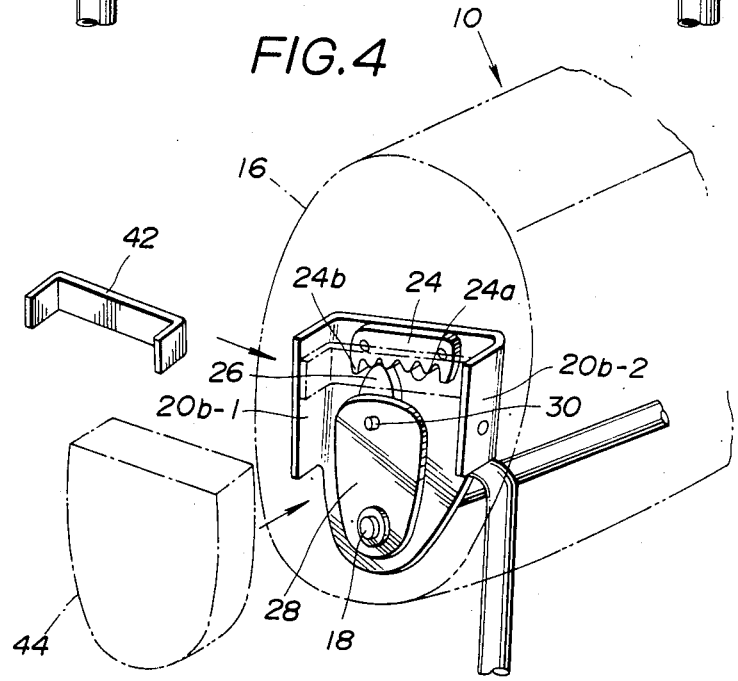
FIG. 4 is a perspective but partial view of the headrest of the first embodiment, showing some parts disassembled for clarification of the drawing.

Referring to FIGS. 1 to 4, there is shown a position adjustable see-through headrest 10, which is a first embodiment of the present invention.

As will be seen from FIG. 1, the headrest 10 of the invention is formed with a rectangular aperture 12 and mounted on two headrest stays 14a and 14b. For clarification of the drawings, a pad member 16 constructed of foamed plastics or the like for covering the framework of the headrest 10 is illustrated by a phantom line. Upon practical use of the headrest 10, the stays 14a and 14b are tightly put in holes formed in a shoulder portion of a seatback (not shown) of an associated seat.

As may be understood from FIG. 1, the headrest 10 comprises generally a lower frame shaft 18 extending across the upper ends of the headrest stays 14a and 14b and fixed to the same, two identical base plates 20a and 20b pivotally connected at the lower portions thereof to axially opposed ends of the lower frame shaft 18, and reversed U-shaped upper frame 22 fixed at its leg portions to upper portions of the base plates 20a and 20b. Thus, it will be appreciated that a pivotal unit consisting of the base plates 20a and 20b and the upper frame 22 is pivotal about the axis of the lower frame shaft 18. As will be understood from FIG. 4, the base plate 20b is formed with spaced side walls 20b-1 and 20b-2.

In order to lock the headrest to a desired angular position relative to the fixed lower frame shaft 18, a position adjusting mechanism is employed which is arranged at one lateral side of the framework of the headrest in a manner as will be described hereinafter.

As is seen from FIGS. 2 and 3, the position adjusting mechanism comprises a ratchet plate 24 which is secured to the outboard surface of the base plate 20b with its teeth 24a facing toward the lower frame shat 18. The plate 24 is formed with a downwardly extending finger portion 24b at its front portion. Selectively engageable with the teeth 24a is a pawl member 26 which is pivotally connected to a pawl carrying plate 28 through a pivot pin 30. The pawl member 26 is generally in a triangular form having a first pawl section 26a practically engageable with the teeth 24a of the ratchet plate 24, a second pawl section 26b practically engageable with an after-mentioned lock cancelling plate 34, and a projected section 26c to which an end of an after-mentioned spring 38 is hooked.

The pawl carrying plate 28 is secured at its lower portion to the fixed lower frame shaft 18. An enlarged head portion 30a of the pivot pin 30, which abuts on the inboard surface of the pawl member 26, is slidably received in an arcuate groove 29 formed in the outboard side of the base plate 20b. The arcuate groove 29 is concentric with the lower frame shaft 18, so that the pivotal movement of the pivotal unit is carried out having the enlarged head portion 30a of the pivot pin 30 moved along or guided by the arcuate groove 29.

The first pawl section 26a of the pawl member 26 is pressed against the teeth 24a of the ratchet plate 24 by a coil spring 32 which is expanded between the projected section 26c of the pawl member 26 and the fixed pawl carrying plate 28. For connecting the lower end of the spring 32, the pawl carrying plate 28 is formed with an opening (not shown) to which the spring 32 is hooked. As may be seen from FIG. 3, the teeth 24a of the ratchet plate 24 and the pawl member 26 are so designed and arranged that the first pawl section 26a of the pawl member 26 moves on the teeth 26a in "only" the rightward direction, that is, in the clockwise direction in FIG. 3. In other words, the ratchet plate 24 is slidable on the pawl member 26 in "only" the leftward or counterclockwise direction in FIG. 3.

As is seen from FIG. 3, the ratchet plate 24 is formed at its right end with a longer inclined edge 24c which is merged with an inclined edge of the rightmost tooth of the teeth 24a. As will become apparent as the description proceeds, when the headrest 10 is tilted in the counterclockwise direction to its foremost position, the first pawl section 26a of the pawl member 26 rides on the longer inclined edge 24c, cancelling the locking engagement with the teeth 24a.

Figure 5A:
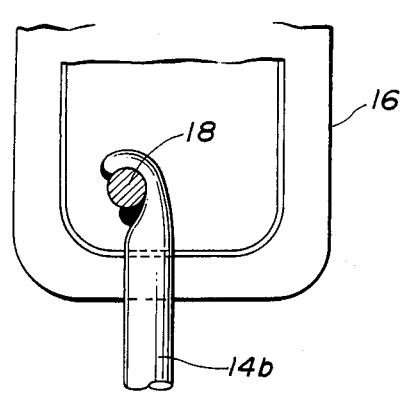
FIGS. 5A and 5B are side but partial views of the headrest of the first embodiment under different conditions.
Figure 5B:
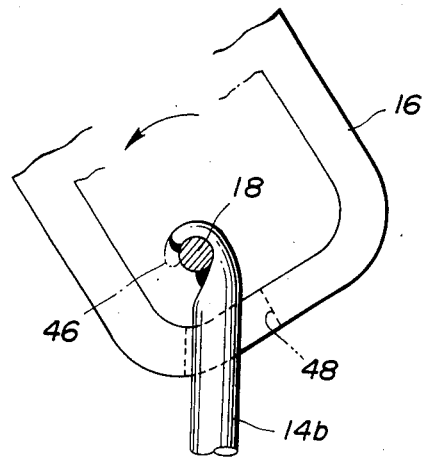
Figure 6:
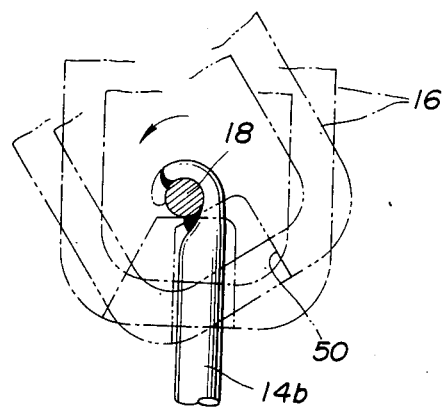
FIG. 6 is a view similar to FIGS. 5A and 5B, but showing a modification of the headrest of the first embodiment.

A lock cancelling plate 34 is rotatably disposed on the lower frame shaft 18 at the position between the base plate 20b and the pawl carrying plate 28. The lock cancelling plate 34 functions to have the pawl member 26 disengaged from the teeth 24a of the ratchet plate 24 under a given state. The lock cancelling plate 34 is formed with a triangular projection 34a which is engageable with the second pawl section 26b of the pawl member 26. The lock cancelling plate 34 is further formed with a lug portion 34b which is engageable with a stopper projection 36 formed on the base plate 20b. Another coil spring 38 is expanded between the lug portion 34b of the lock cancelling plate 34 and the right end of the ratchet plate 24 to bias the lock cancelling plate 34 in the counterclockwise direction in FIG. 3, thereby to bring the same into abutment with the stopper projection 36. As will be seen in FIG. 2, a return spring 40 is disposed about the other end of the lower frame shaft 18 to bias the pivotal unit in the direction of the arrow B (see FIG. 3), that is, toward the rearmost angular position of the headrest proper. As is seen from FIG. 4, a strut 42 is interposed between the side walls 20b-1 and 20b-2 of the base plate 20b to assure meshing engagement between the pawl member 26 and the teeth 24a of the ratchet plate 24. A cover member 44 constructed of a rigid plastics or the like is mounted to the side walls 20b-1 and 20b-2 in a manner to conceal the ratchet plate 24, the pawl member 26, the lock cancelling plate 34 and the pawl carrying plate 28. Preferably, the cover member 44 is hermetically sealingly mounted to the base plate 20b for the reason which will be clarified hereinafter. The framework thus assembled in the above-mentioned manner is covered with a pad member 16 (or foamed plastics) which has the rectangular aperture 12 at the central portion thereof, as is seen from FIGS. 1 and 2. As will be understood from FIG. 5A, upon molding of the foamed plastics, the plastics are also applied to the fixed lower frame shaft 18 and the upper portions of the stays 14a and 14b thereby to disable the pivotal unit (including the base plates 20b and 20a and the reversed U-shaped upper frame 22) from pivoting about the lower frame shaft 18. However, as is seen from FIG. 5B, the bonding of the pad member 16 to the lower frame shaft 18 and the stays 14a and 14b is easily broken when the headrest 10 is pivoted in a certain direction with a considerable force. Thus, thereafter, the pivotal movement of the headrest relative to the lower frame shaft 18 is achieved. In FIG. 5B, portions denoted by numerals 46 and 48 are spaces which have been formed in the pad member 16 near the lower frame shaft 18 and each of the stays 14a and 14b, respectively, as a result of the pivoting movement of the headrest. If desired, as is seen in FIG. 6, by using a suitable mold, recesses 50 may be provided in the pad member 16 for the stays 14a and 14b for achieving a smoother pivoting movement of the headrest relative to the lower frame shaft 18. It is to be noted that by the provision of the cover member 44, the plastic material does not enter the mounting space for the ratchet mechanism, and due to the unique construction of the headrest as mentioned hereinabove, the pivotal arrangement between the pivotal unit and the lower frame shaft 18 is reestablished only by pivoting the headrest after molding of the pad member 16.

In the following, operation of the headrest 10 will be described with reference to the drawings.

For facilitation, the description will be commenced with respect to a condition as shown in FIG. 2. In this condition, the headrest 10 assumes its rearmost angular position wherein the first pawl section 26a of the pawl member 26 is lockingly engaged with the foremost notch of the teeth 24a of the ratchet plate 24, so that clockwise rotation of the headrest 10 is suppressed.

When, upon requirement of angular position change, the headrest 10 is applied with a certain force by an operator or seat occupant in a direction of the arrow F, that is, in the forward direction, the headrest 10 is pivoted forward about the axis of the lower frame shaft 18 sliding the teeth 24a of the ratchet plate 24 forward on the first pawl section 26a of the pawl member 26.

When, during this pivoting, the force application to the headrest 10 stops, the headrest 10 is held in a certain angular position having one of the teeth 24a of the ratchet plate 24 lockingly engaged with the pawl member 26. With this, the headrest 10 can be settled at a desired angular position relative to the headrest stays 14a and 14b on the seatback.

When stopping of the headrest 10 to the desired angular position fails, the forward pivoting of the same is continured until the same comes to the foremost position. Under this condition, the first pawl section 26a of the pawl member 26 is in engagement with the rearmost notch of the teeth 24a of the ratchet plate 24. Thus, further pivoting of the headrest 10 in the same direction causes the longer inclined edge 24c of the ratchet plate 24 to ride on the first pawl section 26a of the pawl member 26, pivoting the pawl member 26 in the counterclockwise direction about the pivot pin 30. This pivoting movement of the pawl member 26 causes the second pawl section 26b thereof to ride over the triangular projection 34a of the lock cancelling plate 34. Thus, under this fully forward tilted condition of the headrest 10, the first pawl section 26a of the pawl member 26 is held disengaged from the teeth 24a of the ratchet plate 24.

When, thereafter, the headrest 10 is applied with a certain force in the rearward direction, that is, in the clockwise direction in FIG. 3, the second pawl section 26b of the pawl member 26 is brought into contact with the right side of the triangular projection 34a of the lock cancelling plate 34 and thus thereafter the pawl member 26 is prevented from pivoting the clockwise direction. Thus, the headrest 10 can be smoothly returned to the initially set rearmost position without inducing locking engagement between the pawl member 26 and the ratchet plate 24. Upon the headrest 10 returning to the rearmost position, the finger portion 24b of the ratchet plate 24 pushes the first pawl section 26a of the pawl member 26 to such a degree that the second pawl section 26b of the same rides over the triangular projection 34a of the lock cancelling plate 34. Thus, thereafter, due to the force of the spring 32, the pawl member 26 is returned to the position illustrated in FIG. 3, wherein the first pawl section 26a is lockingly engaged with the foremost notch of the teeth 24a of the ratchet plate 24 and the second pawl section 26b is disengaged from the lock cancelling plate 34.

Thereafter, forward pivoting of the headrest 10 is carried out again for achieving the desired angular positioning of the same in the aforementioned manner.

Figure 7:
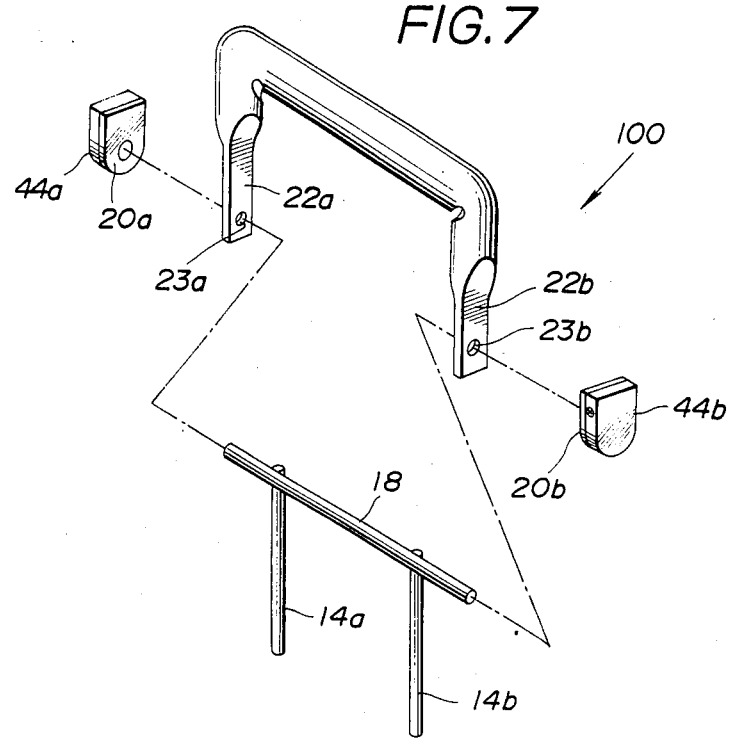
FIG. 7 is an exploded view of essential parts of the headrest of a second embodiment of the present invention.
Figure 8:
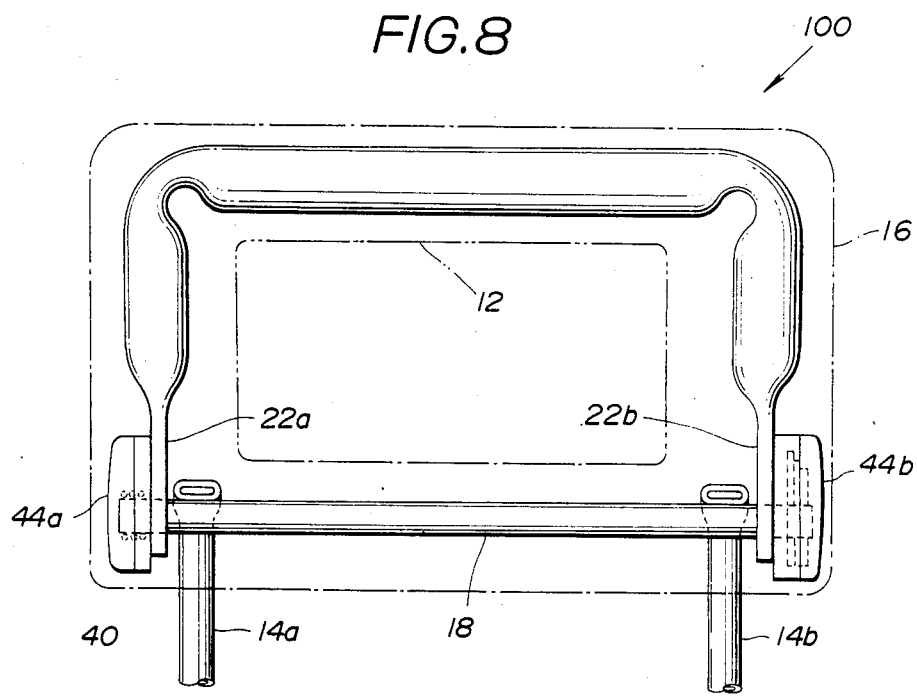
FIG. 8 is a front view of the interior structure of the headrest of the second embodiment.
Figure 9:
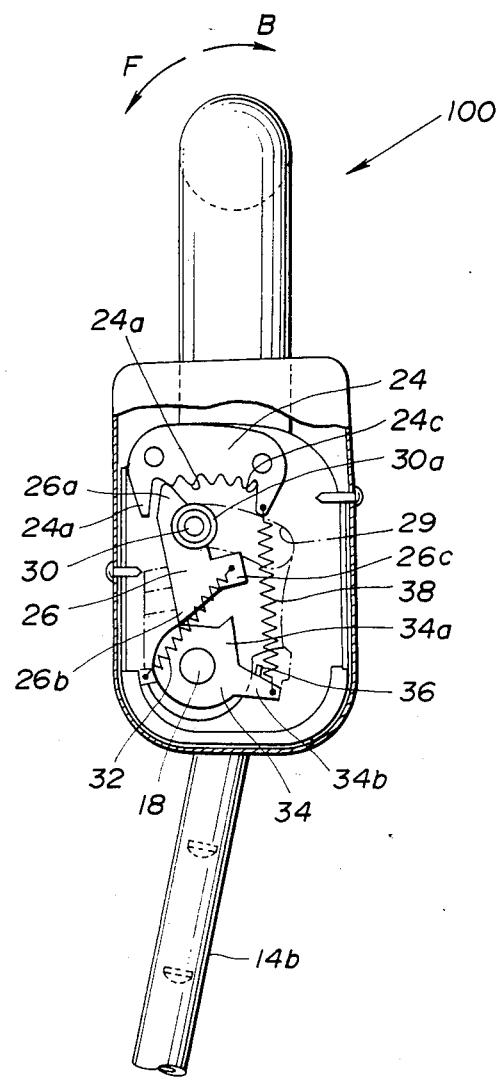
FIG. 9 is a side view of the interior structure of the headrest of the second embodiment.

Referring to FIGS. 7 to 9, there is shown a second embodiment of the headrest of the present invention, which is generally designated by numeral 100.

Since the second embodiment 100 is similar in construction to the aforementioned first embodiment 10, only the parts and construction different from those of the first embodiment 10 will be described in the following.

As is seen from FIG. 7, in the second embodiment 100, the leg portions 22a and 22b of the reversed U-shaped upper frame 22 are formed flat and provided with aligned openings 22c and 22d through which the lower frame shaft 18 passes. The base plates 20a and 20b each having an opening are secured to the outside surfaces of the respective flat leg portions 22a and 22b and receive the axially opposed end portions of the shaft 18 in the openings thereof. Thus, like in the case of the first embodiment, a unit consisting of the base plates 20a and 20b and the upper frame 22 is pivotal about the axis of the lower frame shaft 18.

In order to lock the headrest 100 to a desired angular position relative to the fixed lower frame shaft 18, a position adjusting mechanism is incorporated with one base plate 20b. Since, as will be seen from FIG. 9, the position adjusting mechanism is substantially the same as that of the first embodiment 10, description of the construction and operation of the same will be omitted.

As is seen from FIG. 8, a return spring 40 is disposed about the other end portion of the shaft 18 to bias the pivotal unit in the rearward direction, that is, in the clockwise direction in FIG. 9. Cover members 44a and 44b are sealingly mounted to the base plates 20a and 20b to protect the interior mechanisms from the plastic material which would otherwise attack the same upon molding of the pad member 16.

As may be understood from the foregoing description, in the present invention, the following advantages are given due to its unique construction.

First, because the position adjusting mechanism is compactly assembled in one lateral side of the headrest framework, compactness of the headrest proper is realized without narrowing the aperture of the same.

Second, because of the provision of the cover member 44, the position adjustment mechanism is assuredly protected from pad materials (viz., foamed plastic materials) which would otherwise flow into the cover member 44 and attack the mechanism upon molding of the same.

Third, because of the simple construction of the headrest, it can be produced at a reduced cost.

What is claimed is:

1. An angular position adjustable see-through headrest adapted to be mounted on a seatback of a seat, comprising:
   stays extending from said seatback;
   a lower frame shaft extending across said stays and secured to the same;
   a pivotal reversed U-shaped structure pivotally connected to said lower frame shaft so as to be pivotal about the axis of said lower frame shaft between first and second extreme angular positions;
   a position adjusting mechanism arranged between said pivotal reversed U-shaped structure and said lower frame shaft, said mechanism being operable to lock said pivotal reversed U-shaped structure to a selected one of the angular positions relative to the fixed lower frame shaft;
   a cover member covering said mechanism so as to conceal the same from the exterior of the cover member without affecting the function of the mechanism; and
   a pad member covering substantially entire of a unit including said lower frame shaft, said pivotal reversed U-shaped structure and said mechanism, wherein said pivotal reversed U-shaped structure comprises:
   a reversed U-shaped upper frame; and
   two base plates respectively secured to leg portions of said upper frame, and wherein said position adjusting mechanism comprises:
   a ratchet plate secured to a selected one of said base plates with its teeth facing toward said lower frame shaft;
   a pawl member selectively engageable with said teeth of the ratchet plate, said pawl member having a first pawl section practically engageable with said teeth and a second pawl section;
   a pawl carrying plate secured to the fixed lower frame shaft and pivotally carrying said pawl member through a pivot pin;
   first biasing means for biasing said pawl member in a direction to meshingly engage with the teeth of the ratchet plate;
   a lock cancelling plate rotatably disposed on said lower frame shaft, said plate having a projection which is engageable with said second pawl section of said pawl member;

stopper means for suppressing extreme rotation of said look cancelling plate in a given direction; and second biasing means for biasing said lock cancelling plate in said given direction.

2. An angular position adjustable see-through headrest as claimed in claim 1, further comprising guide means for guiding a movement of said pawl member relative to the selected base plate.

3. An angular position adjustable see-through headrest as claimed in claim 2, in which said guide means comprises an arcuate groove formed in said base plate in a manner to extend concentrical with respect to the axis of said lower frame shaft, said arcuate groove being sized and located to slidably receive an end of said pivot pin of the pawl member.

4. An angular position adjustable see-through headrest as claimed in claim 1, in which said first biasing means is a coil spring which has one end hooked to said pawl member and the other end hooked to said pawl carrying plate.

5. An angular position adjustable see-through headrest as claimed in claim 4, in which said second biasing means is a coil spring which has one end hooked to the selected base plate and the other end hooked to said lock cancelling plate.

6. An angular position adjustable see-through headrest as claimed in claim 5, in which said stopper means comprises:

a projection formed on the selected base plate; and a lug portion of said lock cancelling plate, said lug portion being in abutment with said projection under operation of said second biasing means.

7. An angular position adjustable see-through headrest as claimed in claim 6, in which said base plate has spaced side walls for assuring mounting of said cover member thereto.

8. An angular position adjustable see-through headrest as claimed in claim 7, further comprising a strut which extends between said spaced side walls in a manner to assure the engagement between said pawl member and said teeth of the ratchet plate.

9. An angular position adjustable see-through headrest as claimed in claim 1, in which each of said base plates having an opening through which said lower frame shaft passes.

10. An angular position adjustable see-through headrest as claimed in claim 1, in which said cover member is sealingly mounted to the selected base plate to hermetically seal the parts-mounting space in the cover member.

* * * * *